United States Patent [19]

Brewer

[11] 4,396,807

[45] Aug. 2, 1983

[54] MICROPHONE MOUNTING DEVICE

[76] Inventor: George W. Brewer, 65 Gray Cliff Rd., Newton Center, Mass. 02159

[21] Appl. No.: 183,897

[22] Filed: Sep. 4, 1980

[51] Int. Cl.³ .......................... H04M 1/04; H04R 1/00

[52] U.S. Cl. .................................................. 179/146 R

[58] Field of Search .................... 179/146 R, 147, 148, 179/149, 150, 151, 152, 153, 154, 179, 180, 184

[56] References Cited

U.S. PATENT DOCUMENTS

| | | | |
|---|---|---|---|
| 1,805,362 | 5/1931 | Ellis | 179/146 R |
| 3,566,047 | 2/1971 | Weingartner et al. | 179/179 |
| 4,194,096 | 3/1980 | Ramsey | 179/147 |

FOREIGN PATENT DOCUMENTS

| | | | |
|---|---|---|---|
| 204100 | 6/1959 | Austria | 179/150 |
| 257716 | 10/1967 | Austria | 179/179 |
| 807862 | 1/1937 | France | 179/103 |
| 318319 | of 1934 | Italy | 179/146 R |
| 547676 | 9/1956 | Italy | 179/147 |
| 1160157 | 7/1969 | United Kingdom | 179/179 |

*Primary Examiner*—George G. Stellar
*Attorney, Agent, or Firm*—Bruce D. Sunstein

[57] ABSTRACT

A microphone mounting device has a shaft emulative of a microphone handle and a structure, for holding the microphone, attached to the shaft. In a preferred embodiment of the invention, the structure includes a ring having a central axis that is attached to the shaft in such a way that the central axis is generally parallel to the longitudinal axis of the shaft. In this embodiment there are disposed around the ring a plurality of elastic loops that releasably hold the microphone in place.

3 Claims, 3 Drawing Figures

MICROPHONE MOUNTING DEVICE

DESCRIPTION

1. Technical Field

The present invention relates generally to microphone mounting devices, and particularly to microphone mounting devices that provide acoustic isolation to microphones mounted therein.

2. Background Art

Acoustic isolation mounts for microphones are well known in the prior art. In a common prior art device, there is provided a frame that is capable of being rigidly attached to a microphone stand or boom and a means for holding the microphone in relative accoustic isolation within the frame. The frame is typically circular, as in the case of certain devices sold in the United States under the AKG trademark, or square, as in the case of some devices sold under the Electro-Voice trademark. In either case, the microphone is typically retained near the geometric center of the frame. It is common to fix elastic elements to the frame under gentle tension and to utilize such elastic elements to retain the microphone within the frame in such fashion as to provide relative accoustic isolation.

Commonly, however, it is difficult to remove a microphone mounted in a prior art device from the microphone stand or boom. Also commonly, it is often difficult or expensive to replace the elastic elements used to retain the the microphone within in the frame. Finally, attachment of the frame of a prior art microphone mounting device to a microphone stand or boom is often a relatively complicated matter.

DISCLOSURE OF INVENTION

It is an object of the present invention to provide a novel microphone mounting device.

It is also an object of the present invention to provide a microphone mounting device that can be removed from and attached to a microphone stand or boom rapidly and easily.

It is a further object of the present invention to provide a microphone mounting device having elastic elements that are inexpensive and capable of quick and easy replacement.

These and other objects of the invention are achieved by providing a shaft emulative of a microphone handle and a means, affixed to the shaft, for holding the microphone. In a preferred embodiment of the device, the means for holding the microphone includes a ring having a central axis that is attached to the shaft in such a way that the central axis is generally parallel to the longitudinal axis of the shaft. In this embodiment there are disposed around the ring a plurality of elastic loops that releasably hold the microphone in place.

BRIEF DESCRIPTION OF THE DRAWINGS

These and other objects and features of the invention will be more readily understood by consideration of the following detailed description taken with the accompanying drawings, in which.

DESCRIPTION OF SPECIFIC EMBODIMENTS

Figure 1:
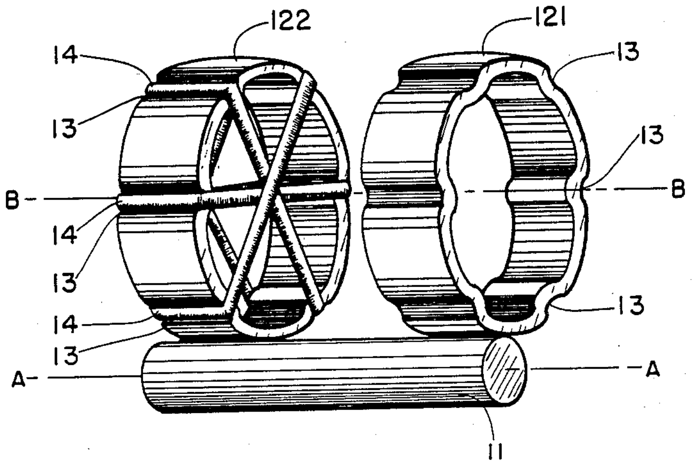
FIG. 1 is a perspective view of a preferred embodiment of a device made in accordance with the present invention.

Referring to FIG. 1, there is shown a perspective view of a preferred embodiment of a device made in accordance with the present invention. The device includes a shaft 11 having a longitudinal axis shown as AA. The shaft 11 is emulative of a microphone handle, so that it can be grasped by conventional locking microphone clamp or microphone clip. Although the shaft shown is cylindrical in shape, it may in certain applications be appropriate to employ a shaft having a shape of a conic section or barrel shape or other similar shape. To make the shaft lighter, it may be hollow, and, if desired, it may be fitted with end caps.

Fixed to the shaft are two rings 121 and 122 having a common central axis BB. Although these rings are shown as circular, in other instances it may be suitable to provide rings that are generally square or eliptical in cross section. Regardless of the exact cross sectional figure, these items are referred to in this description and in the following claims as "rings". The rings are fitted with a plurality of loops 14. For purposes of illustration, the loops associated with ring 121 are omitted from the drawing, but the preferred embodiment nevertheless would include loops associated with ring 121. The inventor has found it convenient to provide three elastic loops 14 for each ring 121 and 122. The number of loops is to some degree a matter of choice and to some degree dictated by the geometry of the ring. For example, use of a ring having a generally square-shaped cross section would suggest using either two or four loops per ring. The rings are provided with a series of channels 13 to retain the loops in a specific orientation around each ring. The loops are oriented so that segments thereof coincide approximately with diameters of a cross section of the rings.

Figure 2:
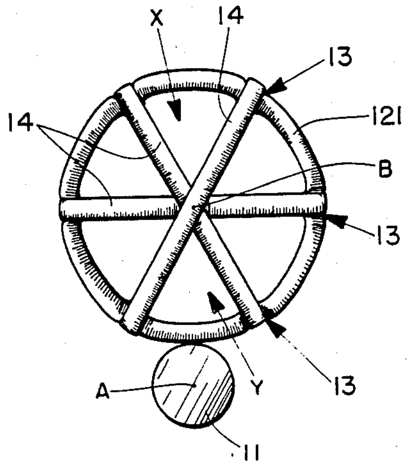
FIG. 2 is an end view of the device shown in FIG. 1.

Turning now to FIG. 2, there is shown an end view of the device illustrated in FIG. 1. The device is viewed from the end of ring 121. The axis AA of FIG. 1 becomes point A of FIG. 2. Similarly, the axis BB of FIG. 1 becomes point B of FIG. 2. The segments of the elastic loops 14 are shown in relation to the ring 121 as approximating diameters of a cross section thereof.

Figure 3:
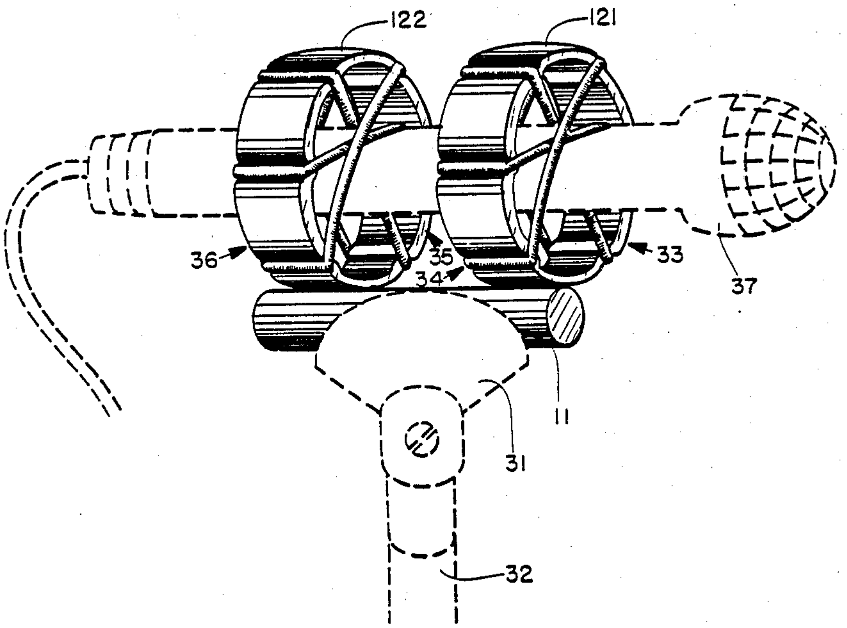
FIG. 3 is a perspective view of the device shown in FIG. 1 as used to mount a microphone.

Referring now to FIG. 3, there is shown the use of the microphone 37 in the device heretofore described. The device is placed so that its shaft 11 reposes in microphone clip 31 which in turn is mounted on stand 32. In typical application, the microphone 37 is placed in the mount as follows. The microphone is inserted beginning at end 33 of the device. At region 33 of FIG. 3, the microphone is pushed through area X (shown in FIG. 2) associated with ring 121; when the microphone reaches region 34 of FIG. 3 the end is pushed through region Y (shown in FIG. 2) associated with the ring. When the microphone reaches region 35 of ring 122 in FIG. 3, it is placed through the lower region (equivalent to region Y shown in FIG. 2 for ring 121) of ring 122. Finally, when the microphone end reaches region 36 of ring 122 it is fed into the upper region (corresponding to region X of ring 121 of FIG. 2) of ring 122. The manner in which a microphone is threaded through the invention is, to a considerable degree, a matter of choice, however, and other placements of the microphone within the invention are possible.

The invention permits the mounting of a wide variety of microphones. In the embodiment and use illustrated in FIG. 3, the assembly comprising the microphone and the mounting device may be readily removed as a unit from clip 31 and the assembly can then, for example, be hand-held or stored as a unit. Moreover, use of the invention enables one to utililize a single microphone clip to mount any of a variety of microphones interchangeably, regardless of their sizes and shapes.

Accordingly, the invention has been described with particular reference to specific embodiments thereof in the interest of complete definiteness, it will be understood that it may be embodied in a variety of forms diverse from those shown and described without departing from the spirit and scope of the invention as defined by the following claims:

What is claimed is:

1. A device for mounting a microphone having a longitudinal axis, such device comprising:

a shaft, emulative of a microphone handle and having a longitudinal axis; and first means affixed to the shaft and distinct therefrom, for releasably holding the microphone so that its longitudinal axis is approximately parallel to and distinct from the longitudinal axis of the shaft;

first and second rings, each having a central axis, and each affixed to the shaft in such a way that the central axes thereof are approximately parallel to the longitudinal axis of the shaft; and first and second sets of a plurality of elastic loops, each set of such loops being disposed in relation to one of the first and second rings in such a manner that a segment of each loop is in approximate coincidence with a chord of a cross section of such ring, such cross section being in a plane perpendicular to the central axis of such ring, each loop being disposed around one of the two rings so as to provide two segments, each segment being as aforesaid.

2. A device according to claim 1, wherein the outer surface of each ring includes a series of channels in which segments of the elastic loops associated therewith are situated and by means of which such elastic loops are releasably retained in position on such ring.

3. A device according to claim 2, wherein each ring has a circular cross section and the chord of each ring is a diameter of such cross section.

* * * * *